(12) United States Patent
Logan

(10) Patent No.: US 10,058,990 B1
(45) Date of Patent: Aug. 28, 2018

(54) SHOCK-ABSORBING SHOVEL HANDLE

(71) Applicant: Titus Logan, Trumbull, CT (US)

(72) Inventor: Titus Logan, Trumbull, CT (US)

( * ) Notice: Subject to any disclaimer, the term of this patent is extended or adjusted under 35 U.S.C. 154(b) by 0 days.

(21) Appl. No.: 15/900,375

(22) Filed: Feb. 20, 2018

(51) Int. Cl.
B25G 1/01 (2006.01)
A01B 1/02 (2006.01)

(52) U.S. Cl.
CPC . *B25G 1/01* (2013.01); *A01B 1/02* (2013.01)

(58) Field of Classification Search
CPC .. E01H 5/02; A21B 3/003; B25G 3/02; B25G 1/01; A01B 1/02
See application file for complete search history.

(56) References Cited

U.S. PATENT DOCUMENTS

| | | | | |
|---|---|---|---|---|
| 2,713,472 A * | 7/1955 | Bodine, Jr. | ............... | E21B 7/24 175/243 |
| 2,996,111 A * | 8/1961 | Mocerino | ............... | A01B 1/02 126/401 |
| 4,730,860 A * | 3/1988 | Padgett | .................... | A01B 1/02 294/49 |
| 5,533,768 A | 7/1996 | Mitchell | | |
| 5,816,634 A | 10/1998 | Jacobs | | |
| 6,792,829 B2 | 9/2004 | Garcia | | |
| 7,118,145 B1 | 10/2006 | Rosine | | |
| D572,094 S * | 7/2008 | Rosine | ............................ | D8/10 |
| 7,581,771 B2 | 9/2009 | Rosine | | |
| 8,327,516 B2 * | 12/2012 | Kliskey | ................... | B60C 25/18 29/253 |
| D731,265 S | 6/2015 | Clark | | |
| 9,198,337 B2 | 12/2015 | Walsh | | |
| 9,623,548 B1 | 4/2017 | Johnson | | |

FOREIGN PATENT DOCUMENTS

CA 2132046 9/1994

* cited by examiner

Primary Examiner — Stephen A Vu

(57) ABSTRACT

The shock-absorbing shovel handle comprises an upper handle, a lower handle, and a shock absorber. A tool element couples to the lower end of the lower handle. The upper handle comprises an upper cavity and the lower handle comprises a lower cavity. The shock absorber resides within the upper cavity and the lower cavity and is coupled to the upper handle at one end of the shock absorber and to the lower handle at the opposing end of the shock absorber. The lower handle extends into and slides within the upper cavity, with the sliding motion limited by the resistance of the shock absorber. If the tool element strikes an obstruction while being held by the upper handle, the shock of the strike is absorbed by the shock absorber as the lower handle slides into the upper handle and then returns to its starting position.

10 Claims, 5 Drawing Sheets

SHOCK-ABSORBING SHOVEL HANDLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools, more specifically, a shock-absorbing shovel handle.

SUMMARY OF INVENTION

The shock-absorbing shovel handle comprises an upper handle, a lower handle, and a shock absorber. A tool element couples to the lower end of the lower handle. The upper handle comprises an upper cavity and the lower handle comprises a lower cavity. The shock absorber resides within the upper cavity and the lower cavity and is coupled to the upper handle at one end of the shock absorber and to the lower handle at the opposing end of the shock absorber. The lower handle extends into and slides within the upper cavity, with the sliding motion limited by the resistance of the shock absorber. If the tool element strikes an obstruction while being held by the upper handle, the shock of the strike is absorbed by the shock absorber as the lower handle slides into the upper handle and then returns to its starting position.

An object of the invention is to provide a handle for a tool element.

Another object of the invention is to provide a shock absorber within the handle.

A further object of the invention is to allow replacement of the shock absorber.

Yet another object of the invention is to provide prevent misalignment of the upper handle and the lower handle.

These together with additional objects, features and advantages of the shock-absorbing shovel handle will be readily apparent to those of ordinary skill in the art upon reading the following detailed description of the presently preferred, but nonetheless illustrative, embodiments when taken in conjunction with the accompanying drawings.

In this respect, before explaining the current embodiments of the shock-absorbing shovel handle in detail, it is to be understood that the shock-absorbing shovel handle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shock-absorbing shovel handle.

It is therefore important that the claims be regarded as including such equivalent construction insofar as they do not depart from the spirit and scope of the shock-absorbing shovel handle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
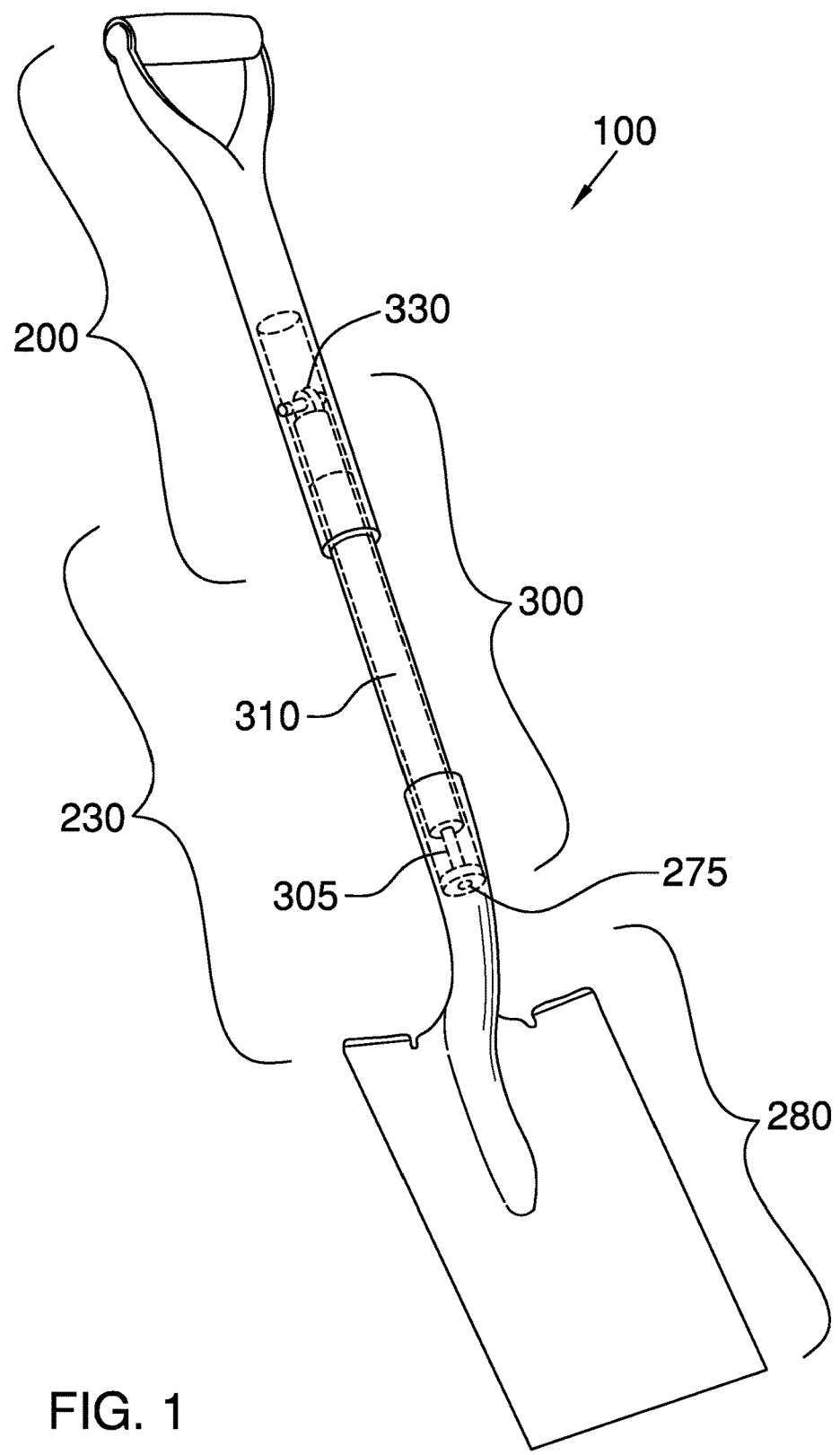
FIG. 1 is a perspective view of an embodiment of the disclosure.
Figure 2:
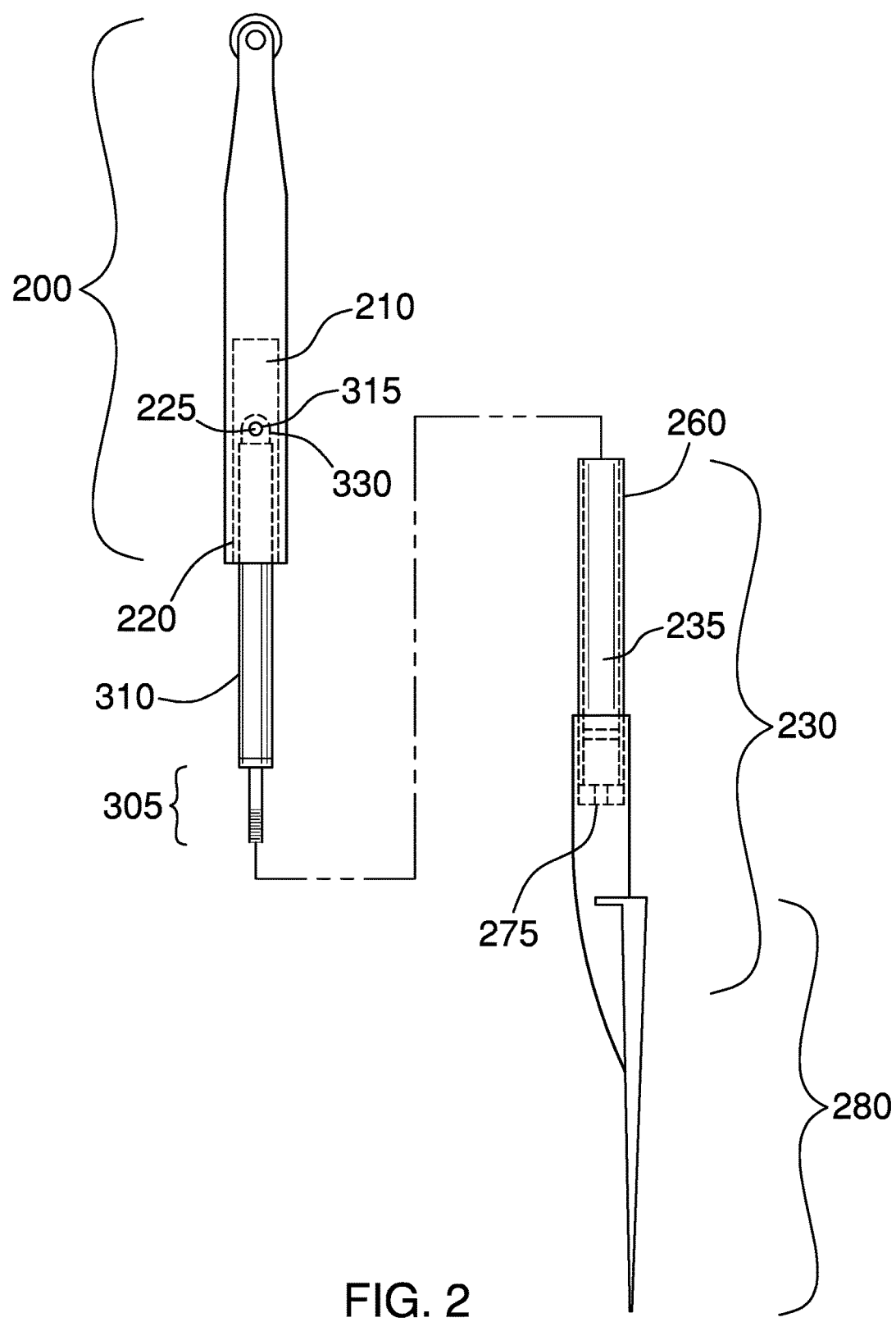
FIG. 2 is an exploded view of an embodiment of the disclosure.
Figures 3, 4:
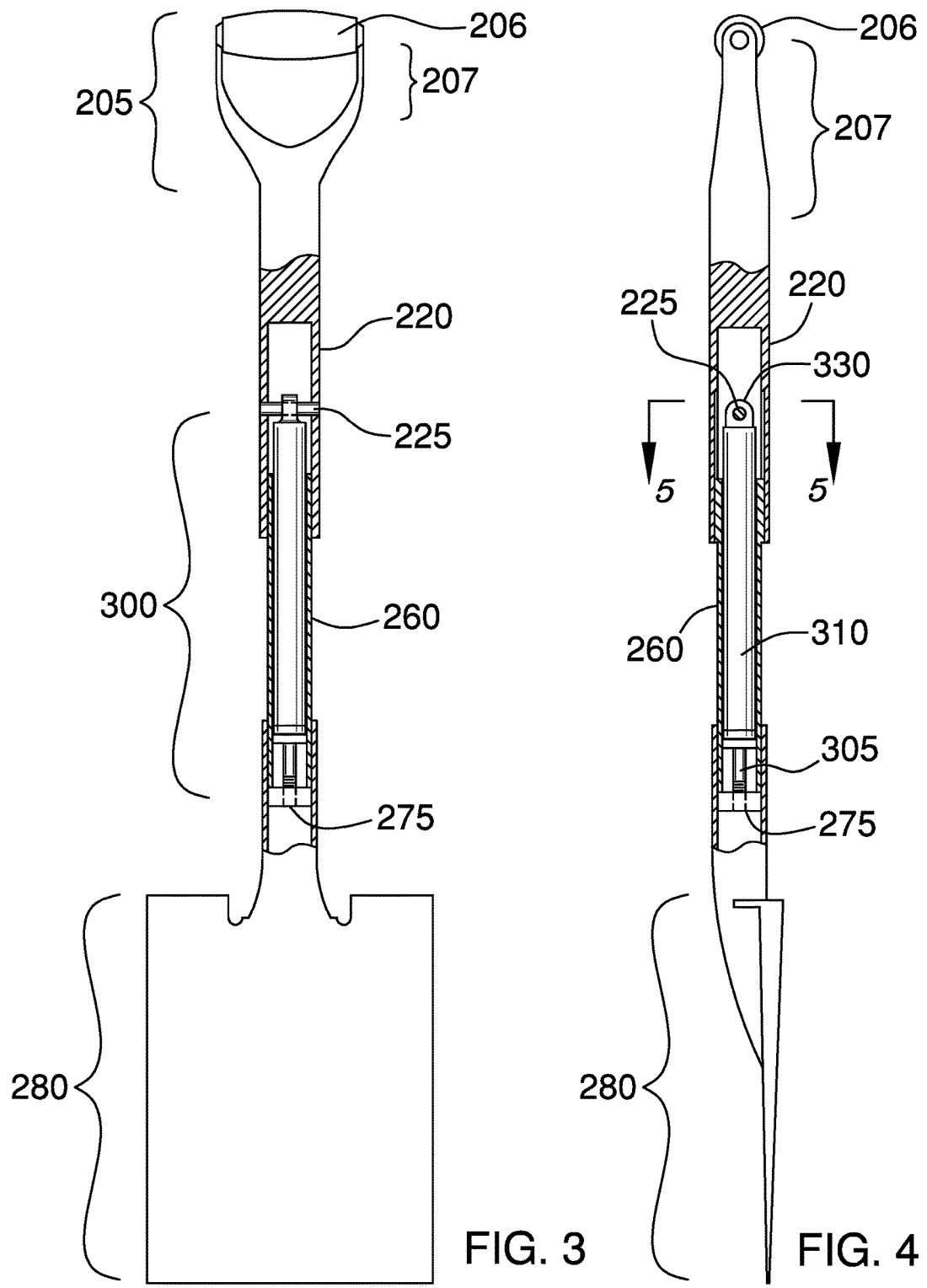
FIG. 3 is a rear view of an embodiment of the disclosure.
FIG. 4 is a side view of an embodiment of the disclosure.
Figure 5:
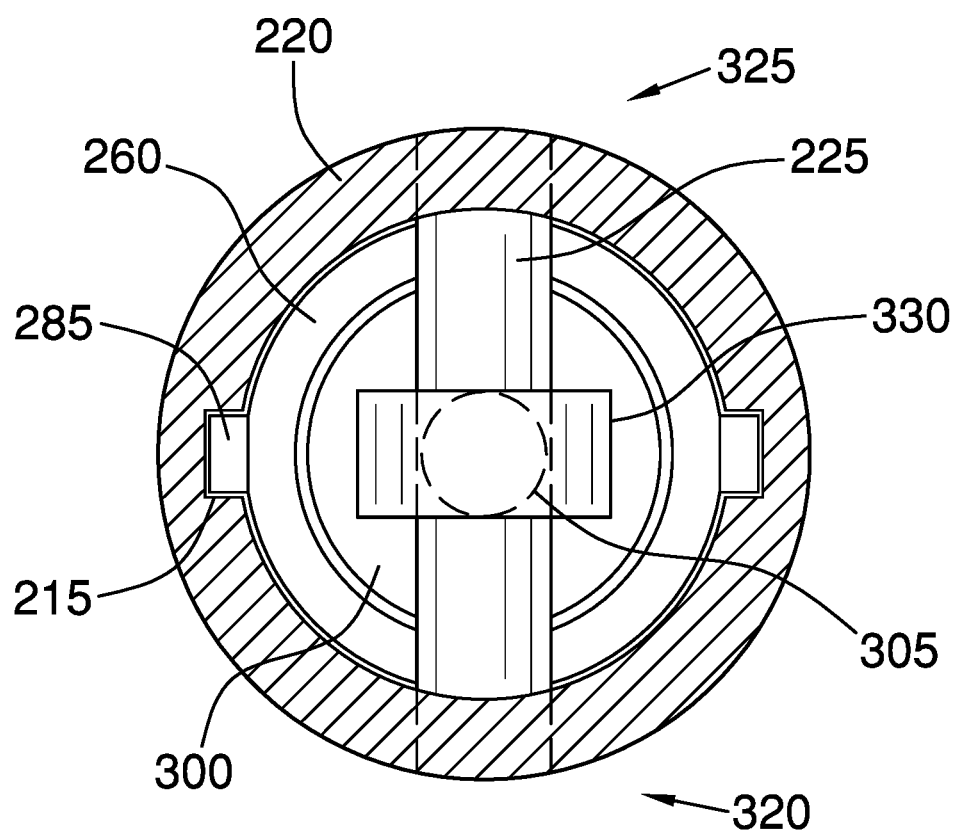
FIG. 5 is a cross-sectional view of an embodiment of the disclosure across 5-5 as shown in FIG. 4.
Figure 6:
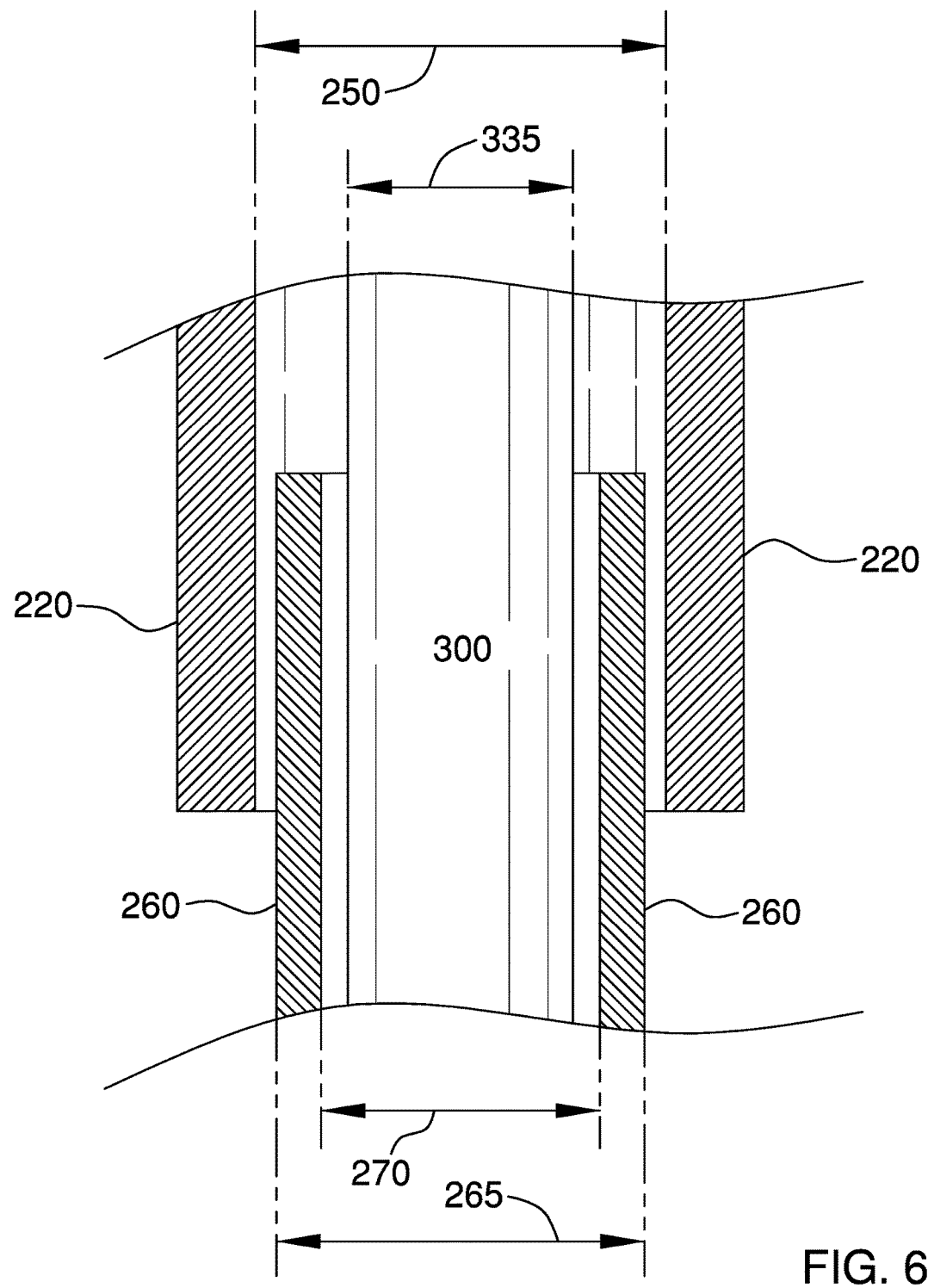
FIG. 6 is a detail view of an embodiment of the disclosure illustrating the relative placement of the outer sleeve, inner sleeve, and shock absorber.

Detailed reference will now be made to a first potential embodiment of the disclosure, which is illustrated in FIGS. 1 through 6.

The shock-absorbing shovel handle 100 (hereinafter invention) comprises an upper handle 200, a lower handle 230, and a shock absorber 300. The upper handle 200, the lower handle 230, and the shock absorber 300 comprise a handle configured to couple to a tool element 280. The upper handle 200, the lower handle 230, and the shock absorber 300 may be configured to minimize injuries due to repetitive or impactful motions of the tool element 280.

Throughout this document, the terms "up" and "down" apply to the invention 100 being held in a vertical orientation where the tool element 280 is touching the ground and the end of the invention 100 that is opposite the tool element 280 is directly above the tool element 280.

The upper handle 200 may be a cylindrical shaft comprising an upper cavity 210. The bottom end of the upper handle 200 may be adapted to be a hand grasp for a first user hand (not illustrated in the figures). The upper handle 200 may be composed of wood, plastic, resin, metal, fiberglass, or combinations thereof.

The upper end of the upper handle 200 may be adapted to be a hand grasp for a second user hand (not illustrated in the figures).

In some embodiments, the upper handle 200 may comprise a hand grip 205. The hand grip 205 may be adapted to be a hand grasp for the second user hand. The hand grip 205 may be coupled to the upper end of the upper handle 200.

In some embodiments, the hand grip 205 may be a D-grip comprising a straight horizontal top portion 206 and a semi-circular or V-shaped lower portion 207.

The upper cavity 210 may be a hollow central portion of the upper handle 200 that opens to the outside of the upper handle 200 at the bottom end of the upper handle 200.

The upper cavity 210 may be cylindrical and may be oriented such that the longitudinal axis of the upper handle 200 and the longitudinal axis of the upper cavity 210 coincide.

The portion of the upper handle 200 between the outside of the upper handle 200 and the upper cavity 210 defines an outer sleeve 220. The outer sleeve 220 comprises a cylindrical wall surrounding the lower end of the upper handle 200.

The lower handle 230 may be a cylindrical shaft comprising a lower cavity 235. The lower end of the lower handle 230 may be configured to couple to the tool element 280.

The lower cavity 235 may be a hollow central portion of the lower handle 230 that opens to the outside of the lower handle 230 at the top end of the lower handle 230.

The lower cavity 235 may be cylindrical and may be oriented such that the longitudinal axis of the lower handle 230 and the longitudinal axis of the lower cavity 235 coincide.

The portion of the lower handle 230 between the outside of the lower handle 230 and the lower cavity 235 defines an inner sleeve 260. The inner sleeve 260 comprises a cylindrical wall surrounding the lower end of the upper handle 200.

An outside diameter of inner sleeve 265 may be less than an inside diameter of outer sleeve 250 such that the inner sleeve 260 may slide into the upper cavity 210. When the upper handle 200, the lower handle 230, and the shock absorber 300 are assembled, the outer sleeve 220 of the upper handle 200 may overlap the inner sleeve 260 of the lower handle 230 by a minimum of 5 inches. The upper cavity 210 may provide space for the inner sleeve 260 to slide further into the outer sleeve 220 to accommodate compression of the shock absorber 300.

The shock absorber 300 may couple the upper handle 200 to the lower handle 230. The shock absorber 300 may be a device that absorbs and damps shock impulses. The shock absorber 300 may be a helical spring, a gas spring, a dashpot, or another shock damper. The shock absorber 300 may be located within the lower cavity 235 and the upper cavity 210. The shock absorber may be inaccessible behind the inner sleeve 260 and the outer sleeve 220. An outside diameter of the shock absorber 335 may be less than an inside diameter of inside sleeve 270 so that the shock absorber 300 may be inserted into the inner sleeve 260.

The shock absorber 300 may comprise a threaded shaft 305 extending from the lower end of a main body 310 of the shock absorber 300. The lower end of the lower cavity 235 may comprise a threaded mount 275, which is a threaded aperture. The threaded shaft 305 may screw into the threaded mount 275 to couple the shock absorber 300 to the lower handle 230.

The upper end of the shock absorber 300 may comprise a mounting tab 330. A mounting aperture 315 may pass through the mounting tab 330. The mounting aperture 315 may be oriented with the center of the mounting aperture 315 perpendicular to the longitudinal axis of the shock absorber 300. The shock absorber 300 may couple to the upper handle 200 via a mounting pin 225 that passes through the mounting aperture 315 and through the outer sleeve 220. In some embodiments, the mounting pin 225 may be a bolt that enters the outer sleeve 220 through a first sleeve aperture 340 located on a near side 325 of the outer sleeve 220, passes through the mounting aperture 315, and screws into a second sleeve aperture 345 located on a far side 320 of the outer sleeve 220.

The outer sleeve 220 may comprise one or more alignment grooves 215. The one or more alignment grooves 215 may be located on the inside wall of the outer sleeve 220 and may be oriented longitudinally up and down the upper handle 200. The inner sleeve 260 may comprise one or more alignment pins 285. The one or more alignment pins 285 may extend outward from the inner sleeve 260 and may be oriented longitudinally up and down the inner sleeve 260. When the inner sleeve 260 is slid into the outer sleeve 220, the one or more alignment pins 285 may slide along the one or more alignment grooves 215 and may be prevent twisting and misalignment of the lower handle 230 relative to the upper handle 200.

The invention 100 may further comprise the tool element 280. The tool element 280 may be coupled to the bottom end of the lower handle 230. As non-limiting examples, the tool element 280 may comprise a shovel blade, a spade blade, or a post hole digger blade portion.

In use, the invention 100 is attached to the tool element 280 or, in some embodiments, the invention 100 may comprise the tool element 280. The invention 100 is held with the first user hand on the lower end of the upper handle 200 and the second user hand on the upper end of the upper handle 200. The tool element 280 is pointed towards a work area. By way of example and not of limitation, the tool element 280 may be a shovel blade and the work area be a pile of debris to be move. As the invention 100 is pushed forward using the first user hand and the second user hand, the tool element 280 slide smoothly into the work area until it strikes an obstacle. As a non-limiting example, the obstacle may be a large rock. The obstacle may abruptly stop forward motion of the tool element 280. In prior art shovels, the shock of the sudden stop would be conveyed through the handle to the user's hands, arms, and shoulders. By using the invention 100, the shock is not conveyed to the user. Instead, the shock absorber 300 is compressed and absorbs the shock, allowing the upper handle 200 to stop more gradually. As the shock absorber 300 compresses, the upper handle 200 slides towards the lower handle 230 and the inner sleeve 260 slides farther into the outer sleeve 220. Eventually, the shock absorber 300 rebounds and pushes the upper handle 200 back to its original spacing from the lower handle 230. The shock absorber may be removed by withdrawing the mounting pin 225, pulling the upper handle 200 off, rotating the shock absorber 300 until it releases from the threaded mount 275, and withdrawing the shock absorber 300 from the lower handle 230. The shock absorber 300 may be installed by reversing steps stated above. The shock absorber 300 may be replaced with one having the same or a different force rating.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, a "blade" is a term that is used to describe a wide and flat structure or portion of a larger structure. Non-limiting examples of object which are or which comprise blades may include a knife, a propeller, a shovel, or a cutting edge of a tool.

As used in this disclosure, a "bolt" is a cylindrical shaft that is formed with an exterior screw thread. A bolt is defined with an outer diameter.

Throughout this document any reference to the usage of a "bolt" or "screw" includes the usage of one or more nuts, flat washers, star washers, cotter pins, captive hardware, or other hardware which is ordinarily associated with the use of a bolt or screw and which is appropriate for an embodiment of the invention, whether explicitly stated or not.

As used in this disclosure, a "cavity" is an empty space or negative space that is formed within an object.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, a "handle" is an object by which a tool, object, or door is held or manipulated with the hand.

As used in this disclosure, a "helix" is the three dimensional structure that is formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute. "Helical" is an adjective which indicates that an object is shaped like a helix.

As used in this disclosure, "horizontal" is a directional term that refers to a direction that is perpendicular to the local force of gravity. Unless specifically noted in this disclosure, the horizontal direction is always perpendicular to the vertical direction.

As used herein, "inside diameter" refers to a measurement made on a hollow conduit. Specifically, the inside diameter is the distance from one inside wall to the opposite inside wall. If the conduit is round, then the inside diameter is a true diameter, however the term may also be used in connection with a square conduit in which case the inside diameter is simply the narrowest inside measurement that passes through the center of the conduit.

As used herein, the word "longitudinal" or "longitudinally" refers to a lengthwise or longest direction.

As used in this disclosure, "orientation" refers to the positioning and/or angular alignment of a first object relative to a second object or relative to a reference position or reference direction.

As used herein, "outside diameter" refers to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used in this disclosure, the term "shaft" is used to describe a rigid cylinder that is often used as the handle of a tool or implement. The definition of shaft explicitly includes solid shafts or shafts that comprise a hollow passage through the shaft along the center axis of the shaft cylinder, whether the shaft has one or more sealed ends or not.

As used in this disclosure, a "shovel" is a tool that is used for lifting and moving bulk items such as dirt, snow, or gravel. A shovel can be a hand tool or a mechanical device.

As used in this disclosure, a "sleeve" is a tube like covering that is placed over a rod, shaft or other cylindrical object.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "tab" is an extension of an object for the purpose of facilitating the manipulation of the object, identifying the object, or attaching the object to another object.

As used in this disclosure, a "tool" is a device, an apparatus, or an instrument that is used to carry out an activity, operation, or procedure.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A shock-absorbing shovel handle comprising:
an upper handle, a lower handle, and a shock absorber;

wherein the upper handle, the lower handle, and the shock absorber comprise a handle configured to couple to a tool element;

wherein the upper handle, the lower handle, and the shock absorber is configured to minimize injuries due to repetitive or impactful motions of the tool element;

wherein the upper handle is a cylindrical shaft comprising an upper cavity;

wherein a bottom end of the upper handle is adapted to be a hand grasp for a first user hand;

wherein an upper end of the upper handle is adapted to be a hand grasp for a second user hand;

wherein the upper cavity is a hollow central portion of the upper handle that opens to an outside of the upper handle at a bottom end of the upper handle;

wherein the upper cavity is cylindrical and is oriented such that the longitudinal axis of the upper handle and a longitudinal axis of the upper cavity coincide;

wherein a portion of the upper handle between the outside of the upper handle and the upper cavity defines an outer sleeve;

wherein the outer sleeve comprises a cylindrical wall surrounding a lower end of the upper handle;

wherein the lower handle is a cylindrical shaft comprising a lower cavity;

wherein a lower end of the lower handle is configured to couple to the tool element;

wherein the lower cavity is a hollow central portion of the lower handle that opens to an outside of the lower handle at a top end of the lower handle;

wherein the lower cavity is cylindrical and is oriented such that a longitudinal axis of the lower handle and the longitudinal axis of the lower cavity coincide;

wherein a portion of the lower handle between the outside of the lower handle and the lower cavity defines an inner sleeve;

wherein the inner sleeve comprises a cylindrical wall surrounding the lower end of the upper handle;

wherein an outside diameter of inner sleeve is less than an inside diameter of outer sleeve such that the inner sleeve slides into the upper cavity;

wherein when the upper handle, the lower handle, and the shock absorber are assembled, the outer sleeve of the upper handle overlaps the inner sleeve of the lower handle by a minimum of 5 inches;

wherein the upper cavity provides space for the inner sleeve to slide further into the outer sleeve to accommodate compression of the shock absorber.

2. The shock-absorbing shovel handle according to claim 1 wherein the upper handle is composed of at least one of the following materials: wood, plastic, resin, metal, fiberglass, or combinations thereof.

3. The shock-absorbing shovel handle according to claim 2 wherein the upper handle comprises a hand grip;
wherein the hand grip is adapted to be a hand grasp for the second user hand;
wherein the hand grip is coupled to the upper end of the upper handle.

4. The shock-absorbing shovel handle according to claim 3 wherein the hand grip is a D-grip comprising a straight horizontal top portion and a semi-circular or V-shaped lower portion.

5. The shock-absorbing shovel handle according to claim 1 wherein the shock absorber couples the upper handle to the lower handle;
wherein the shock absorber is a device that absorbs and damps shock impulses;
wherein the shock absorber is a helical spring, a gas spring, a dashpot, or another shock damper;
wherein the shock absorber is located within the lower cavity and the upper cavity;
wherein the shock absorber is inaccessible behind the inner sleeve and the outer sleeve;
wherein an outside diameter of the shock absorber is less than an inside diameter of inside sleeve so that the shock absorber is inserted into the inner sleeve.

6. The shock-absorbing shovel handle according to claim 5 wherein the shock absorber comprises a threaded shaft extending from the lower end of a main body of the shock absorber;
wherein the lower end of the lower cavity comprises a threaded mount which is a threaded aperture;
wherein the threaded shaft screws into the threaded mount to couple the shock absorber to the lower handle.

7. The shock-absorbing shovel handle according to claim 6 wherein the upper end of the shock absorber comprises a mounting tab;
wherein a mounting aperture passes through the mounting tab;
wherein the mounting aperture is oriented with the center of the mounting aperture perpendicular to the longitudinal axis of the shock absorber;
wherein the shock absorber couples to the upper handle via a mounting pin that passes through the mounting aperture and through the outer sleeve.

8. The shock-absorbing shovel handle according to claim 7 wherein the mounting pin is a bolt that enters the outer sleeve through a first sleeve aperture located on a near side of the outer sleeve, passes through the mounting aperture, and screws into a second sleeve aperture located on a far side of the outer sleeve.

9. The shock-absorbing shovel handle according to claim 1 wherein the outer sleeve comprises one or more alignment grooves;
wherein the one or more alignment grooves is located on the inside wall of the outer sleeve and is oriented longitudinally up and down the upper handle;
wherein the inner sleeve comprises one or more alignment pins;
wherein the one or more alignment pins extend outward from the inner sleeve and are oriented longitudinally up and down the inner sleeve;
wherein when the inner sleeve is slid into the outer sleeve, the one or more alignment pins slide along the one or more alignment grooves and prevent twisting and misalignment of the lower handle relative to the upper handle.

10. The shock-absorbing shovel handle according to claim 9 wherein the shock-absorbing shovel handle further comprises the tool element;
wherein the tool element is coupled to the bottom end of the lower handle.

* * * * *